United States Patent
Galanes et al.

(10) Patent No.: US 10,284,439 B2
(45) Date of Patent: May 7, 2019

(54) METHOD FOR MEASURING END-TO-END INTERNET APPLICATION PERFORMANCE

(71) Applicant: Google Inc., Mountain View, CA (US)

(72) Inventors: Francisco Manuel Galanes, Wellesley, MA (US); Pawel Jurczyk, Newton, MA (US); Vivek Ramachandran, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 698 days.

(21) Appl. No.: 14/153,956

(22) Filed: Jan. 13, 2014

(65) Prior Publication Data
US 2015/0156085 A1   Jun. 4, 2015

Related U.S. Application Data

(60) Provisional application No. 61/910,732, filed on Dec. 2, 2013.

(51) Int. Cl.
*H04L 12/24* (2006.01)
*H04L 12/26* (2006.01)
*H04L 12/54* (2013.01)

(52) U.S. Cl.
CPC ...... *H04L 41/5067* (2013.01); *H04L 12/5691* (2013.01); *H04L 43/0888* (2013.01)

(58) Field of Classification Search
CPC .. H04L 43/04; H04L 41/5067; H04L 12/5619
(Continued)

(56) References Cited

U.S. PATENT DOCUMENTS

| 6,078,956 | A | * | 6/2000 | Bryant | H04L 29/06 709/203 |
| 6,701,342 | B1 | * | 3/2004 | Bartz | H04L 41/5003 370/395.21 |

(Continued)

FOREIGN PATENT DOCUMENTS

FR    2837649 A1    9/2003

OTHER PUBLICATIONS

International Search Report for and the Written Opinion of The International Searching Authority for the International Patent Application No. PCT/US2014/068082, dated Mar. 16, 2015, 10 pages.

*Primary Examiner* — Patrice L Winder
*Assistant Examiner* — Aye M Aung
(74) *Attorney, Agent, or Firm* — Lowenstein Sandler LLP (57) ABSTRACT

In a method and system for characterizing Internet application performance, requests for media items from at least one client can be identified. For each of request, a request time, an Internet service provider identity, a location of the client, a data quantity transferred, and an elapsed time for fulfillment of the request can be determined. An evaluation period, a geographic boundary, and an Internet service provider can be identified, and matching requests can be determined, where the matching requests have a request time within the evaluation period, a location within the geographic boundary, and an Internet service provider identity corresponding to the Internet service provider. A transfer rate for each matching request can be calculated based on the data quantity transferred and elapsed time. A percentage of matching requests with a transfer rate meeting a transfer threshold can then be calculated.

17 Claims, 5 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 7,197,557 | B1* | 3/2007 | Asar | H04L 41/5009 707/999.103 |
| 8,521,891 | B1* | 8/2013 | Shinde | G06F 17/30902 709/206 |
| 8,626,910 | B1* | 1/2014 | Lientz | H04L 41/0896 702/186 |
| 8,667,156 | B2* | 3/2014 | Soliman | H04L 41/12 709/229 |
| 8,863,204 | B2* | 10/2014 | Whyte | H04N 21/222 709/219 |
| 9,246,965 | B1* | 1/2016 | Stoica | H04L 65/80 |
| 2002/0099816 | A1* | 7/2002 | Quarterman | H04L 41/5067 709/224 |
| 2003/0217144 | A1* | 11/2003 | Fu | H04L 29/06 709/224 |
| 2005/0050557 | A1* | 3/2005 | Gabryjelski | G11B 27/034 720/600 |
| 2006/0176827 | A1* | 8/2006 | Lehew | H04L 43/00 370/252 |
| 2008/0097980 | A1* | 4/2008 | Sullivan | G06F 17/30864 |
| 2010/0023579 | A1* | 1/2010 | Chapweske | H04N 7/17336 709/203 |
| 2010/0191577 | A1* | 7/2010 | Lu | G06Q 30/02 705/7.32 |
| 2011/0119370 | A1* | 5/2011 | Huang | H04L 43/14 709/224 |
| 2012/0021775 | A1* | 1/2012 | Phillips | G06Q 30/0282 455/456.3 |
| 2012/0036513 | A1* | 2/2012 | Choong | H04L 41/0896 718/104 |
| 2013/0081050 | A1* | 3/2013 | Levien | G06F 9/5027 718/106 |
| 2014/0006951 | A1* | 1/2014 | Hunter | H04H 60/31 715/719 |

* cited by examiner

METHOD FOR MEASURING END-TO-END INTERNET APPLICATION PERFORMANCE

RELATED APPLICATIONS

This application claims priority to U.S. Provisional Application No. 61/910,732, filed Dec. 2, 2013, the entire contents of which are hereby incorporated by reference herein.

TECHNICAL FIELD

Aspects of the present disclosure relate to the field of Internet application performance and, more particularly, to a method for characterizing said end-to-end application performance as delivered through particular Internet service providers.

BACKGROUND

On the Internet, content hosting websites or other applications allow users to upload, view, and share digital content. Such digital content may include audio clips, movie clips, TV clips, and music videos, as well as amateur content such as video blogging, short original videos, pictures, photos, etc.

However, Internet users experience the Internet and these Internet-based applications differently depending on their connection speed, the quality of service of their Internet service provider (ISP), how interconnected said ISP is to the rest of the Internet, availability and load characteristics of application servers, and even the quality of the home network. Given the most common current measurements of ISP performance (e.g., download speed from a server typically geographically close and well interconnected to the user), consumers can be confused when their user experience does not meet the expectations created by a certain access network speed promised by the ISP.

Some metrics currently available attempt to address this issue by characterizing bandwidth available to the end user from a given ISP. However, the most popular of these metrics only measures a partial path, and is thus not fully representative of the application experience any given user could expect. Another technique for assessing application performance focuses on measuring particular application-specific characteristics. However, this type of metric is difficult to replicate, and, though it gives a numerical result that can be representative of the differential performance through a set of ISPs, it is generally difficult to translate to a user experience.

SUMMARY

In some implementations, a method to measure end-to-end Internet application performance through a particular ISP is presented. The method includes identifying a plurality of requests for media items from at least one client, and determining, for each of the plurality of requests a request time, an Internet service provider identity, a location of the client, a data quantity transferred in response to the request, and an elapsed time from issue of the request to fulfillment of the request. The method also includes determining an evaluation period, a geographic boundary, and an Internet service provider, and identifying a plurality of matching requests from the plurality of requests, wherein each of the plurality of matching requests has a request time within the evaluation period, a location within the geographic boundary, and an Internet service provider identity corresponding to the Internet service provider. Additionally, the method includes calculating a transfer rate for each of the plurality of matching requests based on a corresponding data quantity transferred and elapsed time, and calculating a percentage of matching requests of the plurality of matching requests having a transfer rate meeting a transfer threshold.

In some implementations, the method can also include determining a category for the Internet service provider based on the percentage, wherein the category comprises a range of percentages, and providing the category to a user. The category can correspond to a minimum transfer rate to sustain streaming of a media item (e.g., a video) of a first definition.

In some implementations, the method can also include providing at least one measurement URL to the client, wherein the plurality of requests is based on the at least one measurement URL. The client can be a plurality of clients. The data quantity transferred can be downloaded to the client or uploaded from the client.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the disclosure pertain to characterizing an expected user experience for Internet applications based on the transfer speed achievable for a typical user. Requests for media items can be identified, where each request is from a client to a server over the Internet. For each request, a request time, an Internet service provider identity, a location of the client, a data quantity transferred in response to the request, and an elapsed time from issue of the request to fulfillment of the request can be determined. An evaluation period, a geographic boundary, and an Internet service provider can be identified, and matching requests can be determined, where the matching requests have a request time within the evaluation period, a location within the geographic boundary, and an Internet service provider identity corresponding to the Internet service provider. A transfer rate for each matching request can be calculated based on the data quantity transferred and elapsed time. A percentage of matching requests with a transfer rate meeting a transfer threshold can then be calculated.

In some implementations, data regarding requests for downloads can be collected. For example, HTTP GET data is collected if the request is made via a Web server. For each request, the number of bytes transferred (e.g., application bytes) in response to the request is determined. The elapsed time (e.g., the time from when the request was issued to the time when fulfillment of the request is complete and the data is made available to the application) is also determined.

Goodput or the application level throughput can be defined as the number of useful information bits, delivered by the network to a certain destination, per unit of times. As such, a payload-size of the bytes transferred per time-to-last-byte (the elapsed time) sample can represent a goodput sample. Also, for each request the IP address of both the server and the requesting client can be determined along with any other information available about the request (e.g., a user agent of the client, the server name, the server location, etc.).

The client IP address can be used to identify the ISP associated with each request (e.g., using IP to ASN (autonomous system number) mapping), as well as the geographical location of the client. Each goodput sample can then be stored, for example, along with geographical location, ASN/ISP, date of request, and time of request. In other words, the goodput samples can be annotated with information relevant for calculation of a connection speed metric. This data can be utilized to sort the requests to facilitate different types of analysis.

Alternatively, data about requests for uploads can be collected, with the elapsed time being determined from an initial POST request to the end of transfer of data from the client to the server.

Once the data about the requests is determined, a metric based on the data can be computed. Here, a period of time (e.g., 24 hours or one week) can be selected along with an ISP (or ASN) and a geographic location (e.g., a city, county, state, or country). The goodput samples that are annotated with corresponding information (e.g., goodput samples occurring within the selected time period and geographic location, and associated with the selected ISP (or ASN)) can be determined. Each goodput sample can be analyzed to determine whether it is equal to or above a predetermined transfer threshold. The total number of goodput samples that are at or above the threshold can be determined, along with the percentage of these goodput samples out of the total number of samples considered. This percentage can be referred to as the Goodput Above Threshold (GAT).

A consistency threshold can represent a level of GAT required to provide acceptable performance (e.g., 90% or 95%). If a determined GAT is above the consistency threshold, the sample can be considered to meet the basic service requirements for a respective transfer threshold. A transfer threshold may represent a minimum data transfer rate for supporting streaming of media items of a certain quality (e.g., video of a certain definition).

In an embodiment, a transfer threshold can be selected to match an average bitrate in a video quality category (or video of a certain definition). For example, a number (e.g., three) of categories can be established by selecting a number (e.g., two) of transfer thresholds. In this example, categories can correspond to: (1) high definition (HD) video, where an average bitrate of 2.5 Mbps (corresponding to 720p resolution video) is necessary for adequate performance for HD video; (2) standard definition (SD) video, where an average bitrate of 0.7 Mbps (corresponding to 360p resolution video) is necessary for adequate performance for SD video; and (3) unable to support adequate performance, where an average bitrate is below 0.7 Mbps. In these examples, transfer thresholds are defined to match average bitrates associated with the above categories.

In the above example, if the GAT exceeds the HD video category requirement, then the network, including the corresponding ISP, is determined to be able to sustain HD video quality. If the GAT exceeds the SD video category requirement, but is below the HD video requirement, then the network, including the corresponding ISP, is determined to be able to sustain SD video quality. If the GAT does not exceed the threshold for any category, then the network is determined to not be able to sustain adequate performance for either SD or HD video quality.

Aspects of the present disclosure provide a measurement based on an easily accessible instrumentation (e.g., byte count and elapsed time) that allows a user to easily understand the reliability of an ISP to operate at a given level of quality. A network metric (i.e., transfer speed in bits per second) is translated to an expected user experience (i.e., whether a user can expect to be able to watch content of SD and/or HD quality).

Figure 1:
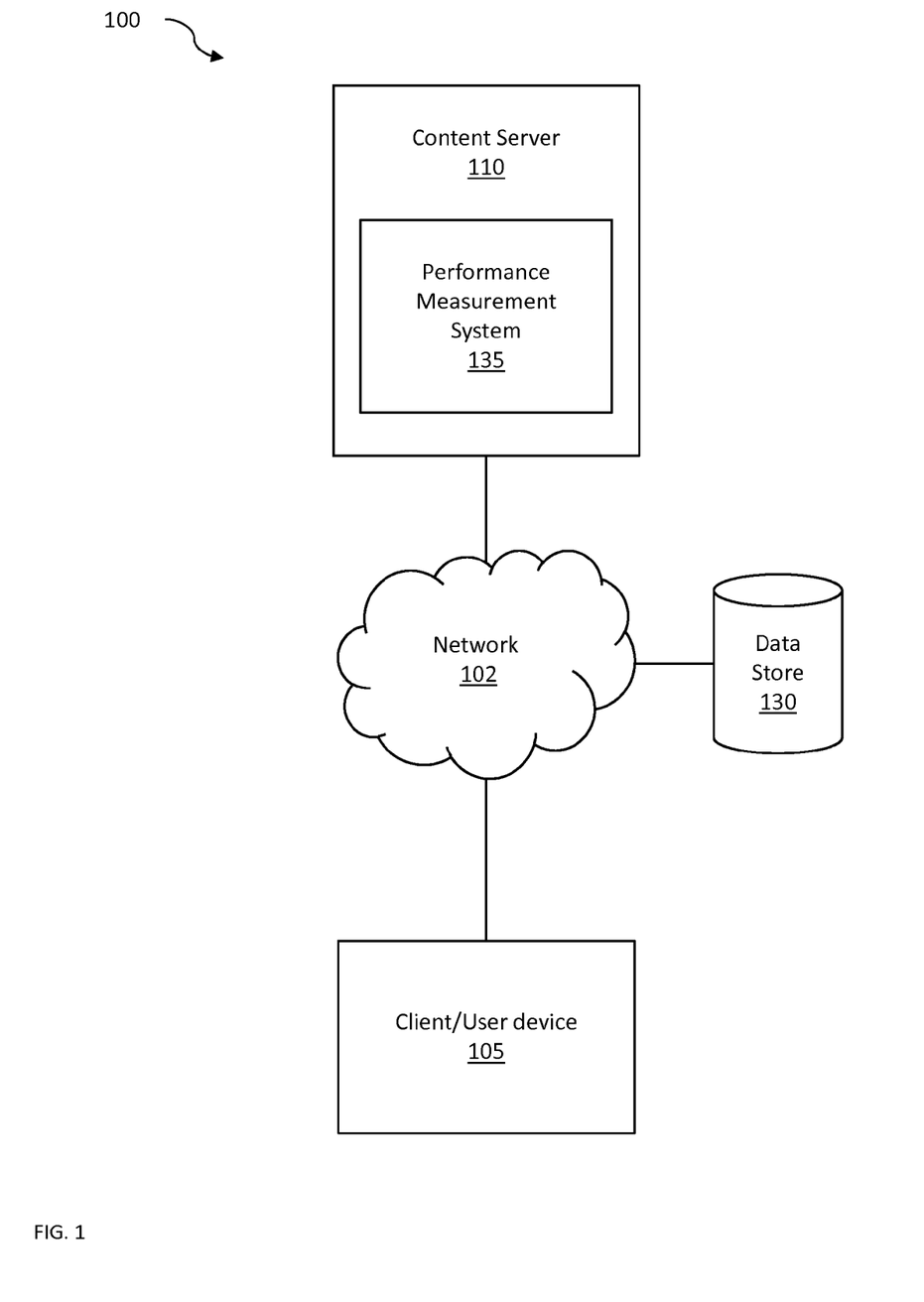
FIG. 1 illustrates exemplary system architecture, in accordance with one embodiment of the present disclosure.

FIG. 1 illustrates exemplary system architecture 100, in accordance with one embodiment of the present disclosure. System 100 comprises a client/user device 105 in communication with (e.g., coupled to) a content server 110 over a network 102, and a data store 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The content server 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices.

In one embodiment, the content server 110 provides media items (e.g., digital video, streaming video, images, digital music, streaming music, social media information, etc.) to one or more of the client/user device 105. For example, the content server 110 may be part of a content sharing platform and may provide a media item, such as a streaming video, requested from an activity feed for a channel by a user for playback on the client/user device 105 via the network 102.

Data store 130 can include one or more writable persistent storage devices, such as memories, tapes or disks. Although each of content server 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of system 100, a user request a media item via client/user device 105 over network 102. The content server 110 receives communications from the client/user device 105, and processes and/or directs these communications accordingly.

In an embodiment, the client/user device 105 makes a request to the content server 110. For example, the client/user device 105 can make a request regarding a media item (e.g., to download a video) from the content server 110. The content server 110 receives and responds to the request. For example, the content server 110 can send the requested media item (e.g., video) to the client/user device 105. The content server 110 may include a performance measurement system 135 that can record a location of the client/user device 105 and an ISP providing Internet access to the client/user device 105 by determining the path that the request traveled to arrive at the content server 110. The performance measurement system 135 can also record the time of the request. The location, ISP, and time of the request can be stored in data store 130.

The client/user device 105 can send a confirmation to the content server 110 when receipt of the requested data (e.g., video content) has been completed. The performance measurement system 135 can record the time of receipt of the confirmation by the content server 110 and quantity of the data transmitted, which can be stored in data store 130.

The performance measurement system 135 can continue to record information about additional requests made by the client/user device 105 and/or other client/user devices. The location, ISP, time of the request, time of the confirmation, and quantity of data recorded for each request can then be used by the performance measurement system 135 for analysis of connection speed in various locations for various ISPs.

In an embodiment, the request from the client/user device 105 can include a request to upload data, rather than download data. Here, the performance measurement system 135 can record the same information as described above, except that the data quantity recorded is the quantity of data uploaded and the time that the data finished uploading is recorded.

Figure 2:
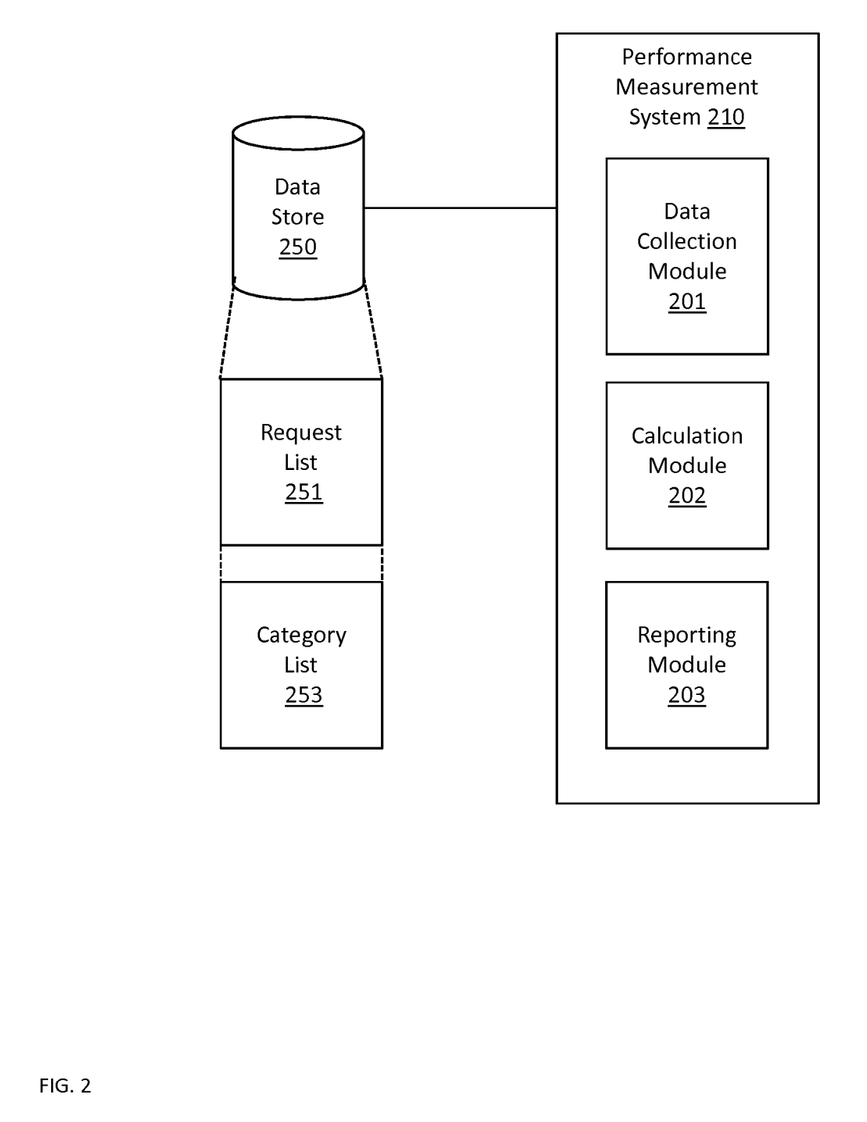
FIG. 2 illustrates a performance measurement system, in accordance with one embodiment of the present disclosure.

FIG. 2 illustrates a performance measurement system 210, in accordance with one embodiment of the present disclosure. The performance measurement system 210 may include a data collection module 201, a calculation module 202, and a reporting module 203. More or less components may be included in the performance measurement system 210 without loss of generality. In an embodiment, performance measurement system 210 is performance measurement system 135 and data store 250 is data store 130 shown in FIG. 1.

In an embodiment, the data collection module 201 collects information about requests (e.g., time of request, path of request including ISP, geographic location of request, and time of confirmation of completion fulfillment of request) from a user/client device to a content server. The data collection module 201 records the information about the request in a request list 251 in data store 250.

In an embodiment, the calculation module 202 analyzes connection speed in particular locations for ISPs for particular time periods. The calculation module 202 determines a geographic boundary, an ISP, and an evaluation period. For example, a user (e.g., a system administrator) can enter the desired measurement parameters, such as a geographic boundary of Los Angeles County, ISP X, and an evaluation period of 8:00 am to 9:00 am on January 1. The calculation module 202 can then determine matching requests in the request list 251. For example, the calculation module 202 will include all of the requests made through ISP X in Los Angeles County between 8:00 am and 9:00 am on January 1.

Of the matching requests, the calculation module 202 can calculate a transfer rate based on an elapsed time (i.e., the time elapsed from the request until confirmation is received that data transmission is complete) and data quantity for each of the matching requests. For example, the transfer rate can be calculated as the data quantity divided by the elapsed time.

Once the transfer rate has been determined for each of the requests, the calculation module 202 can determine whether the transfer rate meets one or more thresholds for each of the requests. The thresholds can be stored in category list 252 in data store 250. For example, the calculation module 202 can determine whether the transfer rate meets a threshold for maintaining HD video quality, or whether the transfer rate meets a threshold for maintaining SD video quality.

Once the calculation module 202 determines whether the transfer rate of each of the requests meets one or more thresholds for each response, the calculation module 202 can determine a percentage of matching requests that meet each threshold out of the matching requests. The connection speed of the ISP for the time period and the geographic location can now be categorized based on the percentage of matching requests.

In one embodiment, goodput thresholds can be defined in terms of MBPS to be used in rating criteria. For example, the average encoded bit rate (+20% overhead) of various video content resolutions can be used for categorization, such that the thresholds represent resolution capacity (e.g., 1080p is 5.0 Mbps, 720p is 2.5 Mbps, 480p is 1.12 Mbps, 360p is 0.7 Mbps, and 240p is 0.5 Mbps).

In one embodiment, the rating criteria can be based on the defined thresholds. Exemplary rating criteria are shown in Table A.

TABLE A

| Criteria | ISP Rating | HD Capability |
| --- | --- | --- |
| 90% of served requests for time period meet 1080p threshold | 5 Star | Yes |
| 90% of served requests for time period meet 720p threshold | 4 Star | Yes |
| 90% of served requests for time period meet 480p threshold | 3 Star | No |
| 90% of served requests for time period meet 360p threshold | 2 Star | No |
| 90% of served requests for time period meet 240p threshold | 1 Star | No |
| Does not meet any of the above | 0 Star | No |

In an example, the time period (or selected granularity) can be a time period just prior to determination of the category, such that results provide a substantially "live" test. For example, the time period can be for 5 minutes preceding the calculation. In another example, the time period can be based on historical data of a selected ISP over a selected duration. For example, the time period can set such that the category can be based on a trailing 30 day average (e.g., rating based on requests from the last 30 days), trailing 24 hour average (e.g., rating based on requests from the previous 24 hours), trailing 7 day average (e.g., rating based on requests from the previous 7 days), hourly performance, etc.

The reporting module 203 can then report the categorization determined by the calculation module 202. For example, the reporting module 203 can report the categorization to a user of a user/client device, to one or more ISPs, or to a publicly available source (e.g., a website). The categorization can be used to determine whether a connection speed provided by an ISP in a particular location would be suitable for particular uses. For example, a potential user could use the categorization to determine which ISP would be the most suitable for the user such that the user would be able to stream HD quality video at the user's home.

Implementations provide a simple and easy to understand metric for evaluating connection speed of various ISPs as it utilizes objective goodput data and avoids any transformations. The method is consistent across different granularities (e.g., substantially instantaneous, hour, day, week, month) and across different data sources (e.g., speed testing services, video streaming services, file downloads, etc.). The ratings thresholds can also provide non-moving targets for ISPs to consider when evaluating targets for improving connection speed.

Figure 3:
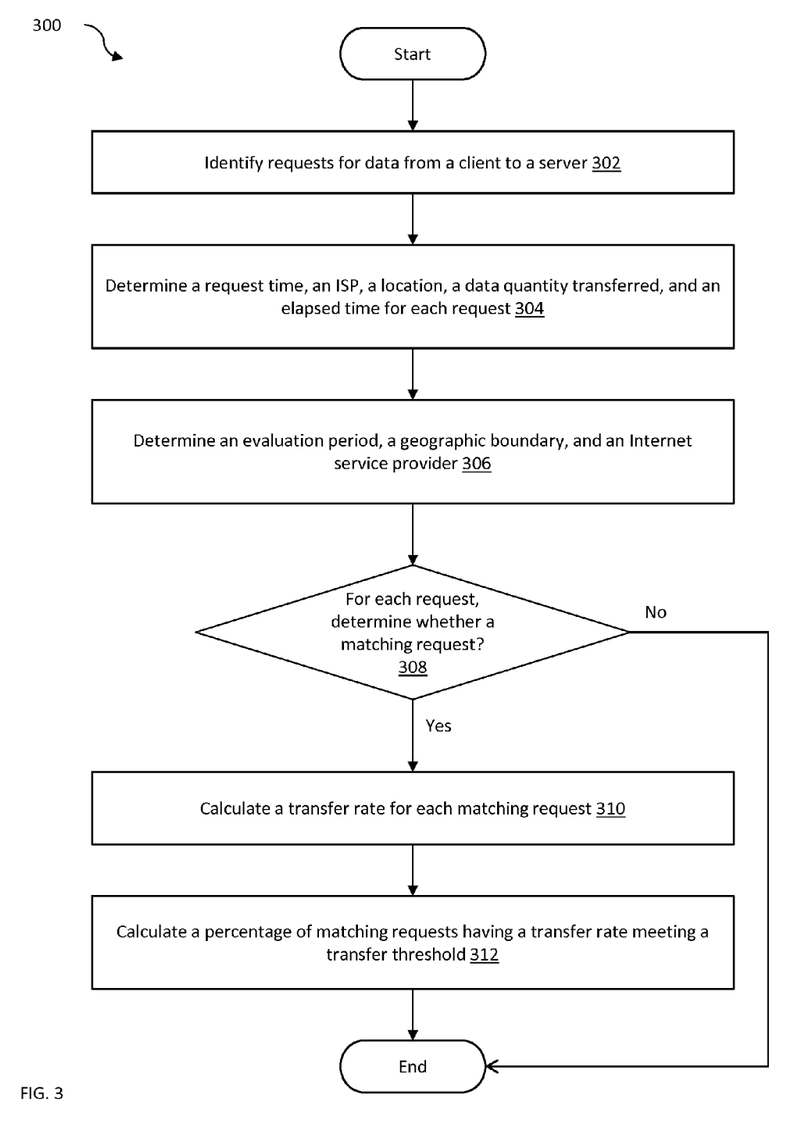
FIG. 3 is a flow diagram illustrating one embodiment for a method of measuring Internet connection speed.

FIG. 3 is a flow diagram illustrating an embodiment for a method 300 of measuring performance of an ISP. The method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 300 is performed by a server (e.g., the content server 110 of FIG. 1).

At block 302, processing logic identifies requests for media items from a client to a server. For example, the requests can be requests for video content.

At block 304, processing logic determines a request time, an ISP identity, a location, a data quantity transferred, and an elapsed time (e.g., time elapsed from request time to completion of data transfer) for each request. For example, the request time could be a particular time of day and date (e.g., 8 am on January 1).

At block 306, processing logic determine an evaluation period, a geographic boundary, and an ISP. For example, the evaluation period can be a time period (e.g., 7:30 am to 8:30 am on January 1). In another example, the geographic boundary can be a set of zip codes, GPS coordinates, or city or county boundaries.

At block 308, processing logic determines, for each request, whether a respective request is a matching request. In other words, the processing logic can determine whether the location is within the geographic boundary, whether the request time is within the evaluation period, and whether the ISP identity matches the ISP.

At block 310, processing logic calculates a transfer rate for each matching request. For example, the transfer rate can be calculated as the data quantity transferred divided by the elapsed time.

At block 312, processing logic calculates a percentage of matching requests having a transfer rate meeting a transfer threshold of the requests. For example, the number of matching requests having a transfer rate meeting a transfer threshold can be divided by the number of matching requests.

Figure 4:
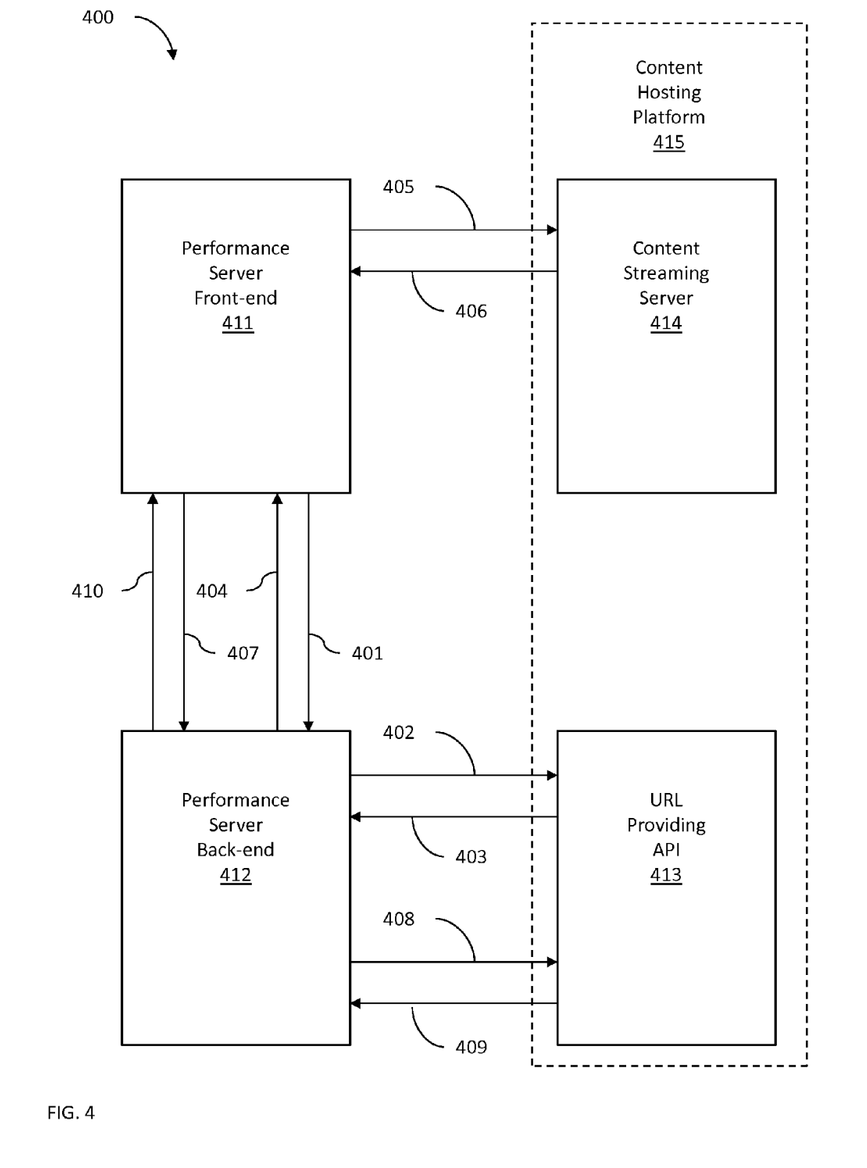
FIG. 4 illustrates a system for actively measuring performance, in accordance with one embodiment of the present disclosure.

FIG. 4 is an example system 400 for actively measuring performance in accordance with one embodiment of the present disclosure. In this embodiment, rather than passively collecting information about requests as the requests occur, a user can actively conduct a test using predetermined requests to analyze connection speed. The system 400 includes a performance test platform having performance server front-end 411 (e.g., a console of a system administrator), and a performance server back-end 412. The system 400 can also include a content hosting platform 415 having a URL providing application programming interface (API) 413 and a content streaming server 414. Alternatively, the URL providing API 413 and the content steaming server 414 can be part of different platforms, systems or physical machines.

In an embodiment, at operation 401, upon a user request, the performance server front-end 411 instructs the performance server back-end 412 to conduct a test to measure performance of ISPs used by the content streaming server 414. At operation 402, the performance server back-end 412 sends a request for measurement uniform resource locators (URLs) to the URL providing API 413. At operation 403, the URL providing API 413 sends the measurement URLs to the performance server back-end 412. A measurement URL specifies the location of a media item that can be provided by the content streaming server 414. At operation 404, the performance server back-end 412 sends the measurement URLs to the performance server front-end 411.

At operation 405, for each measurement URL, the performance server front-end 411 can request a media item corresponding to the measurement URL from the content streaming server 414. The expected data quantity of the media item can be computed by looking at a "range=" query parameter in the measurement URL. If a complete response to the request takes too long (e.g., because of a low goodput), the performance server front-end 411 can cancel the request and report the response as a partial result. At operation 406, the content streaming server 413 can provide the requested media item, and a measurement time can be recorded, where the measurement time is the time elapsed from when the performance server front-end 411 sent the request to the content streaming server 414 to when the last portion of the requested media item is delivered to the performance server front-end 411.

At operation 407, the performance server front-end 411 can provide the measurement time and data quantity for each of the measurement URLs to the performance server back-end 412. At operation 408, the performance server back-end 412 can send the measurement time and data quantity for each of the measurement URLs to the URL providing API 313. The measurement time can represent the elapsed time for a complete response to a request to be received by the performance server front-end 411. The data quantity can represent the number of bytes the performance server front-end 411 received from the content streaming server 414 in response to each request. However, the data quantity could be smaller than the expected data quantity if the performance server front-end 411 canceled the request because too much time had elapsed before a complete response had been received. Additionally, the performance server front-end 411 can indicate that the response from the content streaming server 414 has been verified successfully, along with the URL used for the request. The URL providing API 413 can then calculate a performance result (i.e., a category of connection speed) based on the measurement time and data quantity for each of the measurement URLs. At operation 409, the URL providing API 413 can send the performance result to the performance server back-end 412. At operation 410, the performance server back-end 412 can provide the performance result to the performance server front-end 411 for presentation to a user (e.g., a system administrator) so that the user can analyze whether the connection speed is suitable.

Figure 5:
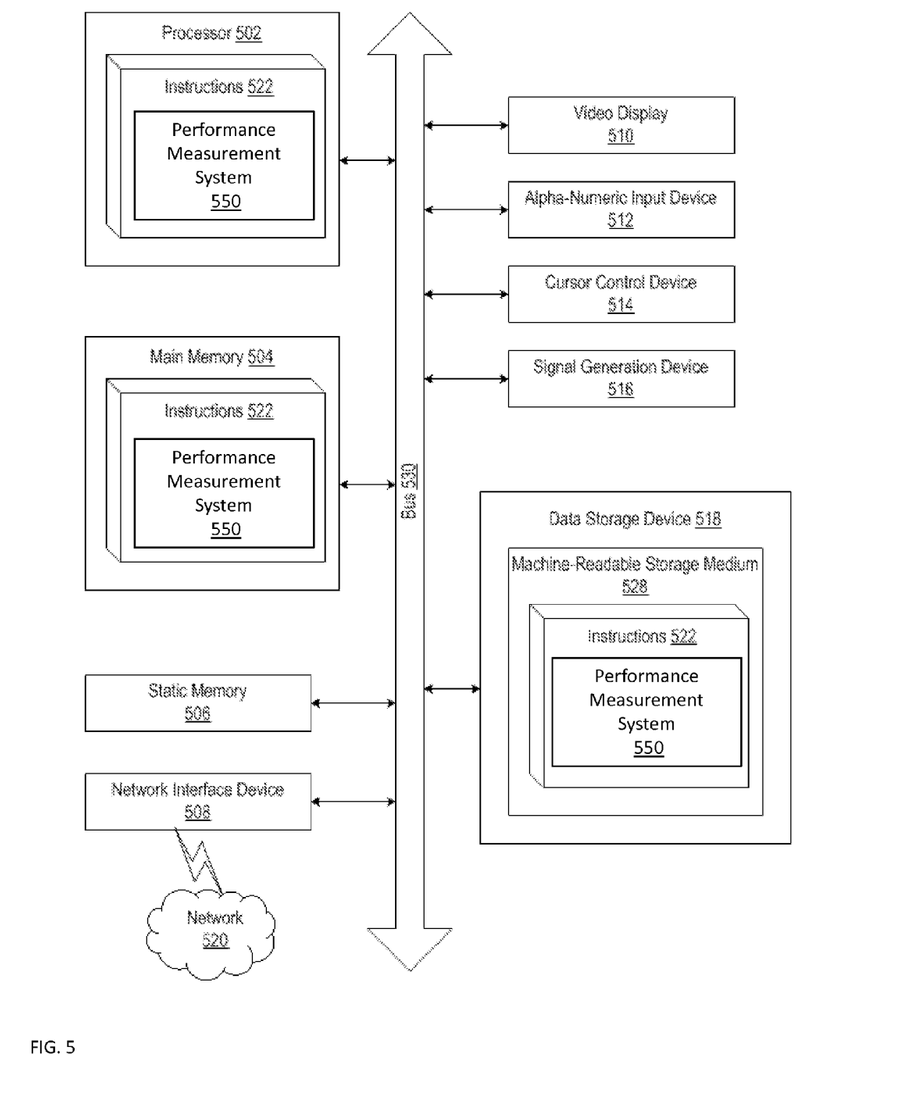
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 516 via the network interface device 522.

In one embodiment, the instructions 526 include instructions for a performance measurement system 550, which may correspond to performance measurement system 135 of FIG. 1, and/or a software library containing methods that measure end-to-end Internet application performance. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:
analyzing, by a processing device of a server computer system, client requests from a plurality of internet service providers, the client requests comprising requests to upload media items and being associated with internet service provider identities, wherein the plurality of internet service providers comprise a first internet service provider and a second internet service provider;
identifying, by the processing device, a set of the client requests that are associated with the first internet service provider based on the internet service provider identities associated with the client requests;
determining, by the processing device, for at least one client request of the set: a request time, an uploaded payload data quantity, and an elapsed time, wherein the elapsed time is for completion of a data transfer of the uploaded payload data quantity;
calculating, by the processing device of the server computer system, a transfer rate comprising an application level throughput for the at least one client request, the transfer rate being based on the uploaded payload data quantity and the elapsed time;
calculating, by the processing device of the server computer system, a performance measurement of the first internet service provider and a performance measurement of the second internet service provider, wherein the performance measurement for the first internet service provider is based on the transfer rate and on a portion of the set of client requests that have a transfer rate meeting a transfer threshold;
determining a category for the first internet service provider based on the performance measurement for the first internet service provider, wherein the category comprises a range of percentages; and
providing the category to a device of a user.

2. The method of claim 1, wherein the category corresponds to a minimum transfer rate to sustain streaming of a media item at a predefined video quality.

3. The method of claim 1, further comprising providing at least one measurement URL to a client of the first Internet service provider, wherein the plurality of requests are based on the at least one measurement URL.

4. The method of claim 3, wherein the client comprises a plurality of clients.

5. The method of claim 1, wherein calculating the performance measurement of the first internet service provider is further based on a payload data quantity downloaded to a client of the first internet service provider.

6. The method of claim 1, wherein the uploaded payload data quantity transferred is uploaded from a client of the first internet service provider to the server computer system.

7. The method of claim 1, wherein the server computer system is separate from the plurality of internet service providers and receives requests of clients of the plurality of internet service providers.

8. The method of claim 1, further comprising, providing for display the performance measurement for the first internet service provider and the performance measurement for the second internet service provider to clients of the plurality of internet service providers.

9. A non-transitory computer readable storage medium having instructions that, when executed by a processing device, cause the processing device to perform operations comprising:
analyzing, by the processing device, client requests from a plurality of internet service providers, the client requests comprising requests to upload media items and being associated with internet service provider identities, wherein the plurality of internet service providers comprise a first internet service provider and a second internet service provider;
identifying a set of the client requests that are associated with the first internet service provider based on the internet service provider identities associated with the client requests;
determining, for at least one client request of the set: a request time, an uploaded payload data quantity, and an elapsed time, wherein the elapsed time is for completion of a data transfer of the uploaded payload data quantity;
calculating a transfer rate comprising an application level throughput for the at least one client request, the transfer rate being based on the uploaded payload data quantity and the elapsed time;
calculating a performance measurement of the first internet service provider and a performance measurement of the second internet service provider, wherein the performance measurement for the first internet service provider is based on the transfer rate and on a portion of the set of client requests that have a transfer rate meeting a transfer threshold;
determining a category for the first internet service provider based on the performance measurement of the first internet service provider, wherein the category comprises a range of percentages; and
providing the category to a device of a user.

10. The non-transitory computer readable storage medium of claim 9, wherein the category corresponds to a minimum transfer rate to sustain streaming of a media item at a predefined video quality.

11. The non-transitory computer readable storage medium of claim 9, wherein the operations further comprise providing at least one measurement URL to a client of the first internet service provider, wherein the plurality of requests are based on the at least one measurement URL.

12. The non-transitory computer readable storage medium of claim 9, wherein calculating the performance measurement of the first internet service provider is further based on a payload data quantity downloaded to a client of the first internet service provider.

13. The non-transitory computer readable storage medium of claim 9, wherein the uploaded payload data quantity transferred is uploaded from a client of the first internet service provider to a server comprising the processing device.

14. A computing device comprising:
a memory; and
a processing device coupled to the memory, wherein the processing device is configured to:
analyze client requests from a plurality of internet service providers, the client requests comprising requests to upload media items and being associated with internet service provider identities, wherein the plurality of internet service providers comprise a first internet service provider and a second internet service provider;
identify a set of the client requests that are associated with the first internet service provider based on the internet service provider identities associated with the client requests;
determine, for at least one client request of the set: a request time, an uploaded payload data quantity, and an elapsed time, wherein the elapsed time is for completion of a data transfer of the uploaded payload data quantity;
calculate a transfer rate comprising an application level throughput for the at least one client request, the transfer rate being based on the uploaded payload data quantity and the elapsed time;
calculate a performance measurement of the first internet service provider and a performance measurement of the second internet service provider, wherein the performance measurement for the first internet service provider is based on the transfer rate and on a portion of the set of client requests having a transfer rate meeting a transfer threshold;
determine a category for the first internet service provider based on the performance measurement of the first internet service provider, wherein the category comprises a range of percentages; and
provide the category to a device of a user.

15. The computing device of claim 14, wherein the category corresponds to a minimum transfer rate to sustain streaming of a media item at a predefined video quality.

16. The computing device of claim 14, wherein the processing device is further configured to provide at least one measurement URL to a client of the first internet service provider, wherein the plurality of requests is based on the at least one measurement URL.

17. The computing device of claim 14, wherein to calculate the performance measurement of the first internet service provider, the processing device is to calculate the performance measurement of the first internet service provider further based on a payload data quantity downloaded to a client of the first internet service provider.

* * * * *